United States Patent [19]

Treseder

[11] 4,367,503

[45] Jan. 4, 1983

[54] FERMETICALLY SEALED DISK FILE

[75] Inventor: Robert C. Treseder, Aptos, Calif.

[73] Assignee: International Business Machines Corporation, Armonk, N.Y.

[21] Appl. No.: 219,794

[22] Filed: Dec. 24, 1980

[51] Int. Cl.³ ............................................. G11B 23/02
[52] U.S. Cl. ..................... 360/98; 360/133; 360/137
[58] Field of Search ............... 360/98, 97, 99, 137, 360/133, 86

[56] References Cited
U.S. PATENT DOCUMENTS
4,150,406  4/1979  Stollorz ........................... 360/133 X

OTHER PUBLICATIONS

"Disk File with Reduced or Eliminated Air Effects", by Tietge IBM/TDB, vol. 23, No. 9, Feb. 1981, pp. 4310, 4311.

"Atmospheric Pressure Compensator***", by Wheeler, IBM/TDB, vol. 20, No. 5, Oct. 1977, pp. 1891, 1892.

Primary Examiner—John H. Wolff
Attorney, Agent, or Firm—Richard E. Cummins

[57] ABSTRACT

A hermetically sealed, helium filled magnetic disk storage file is disclosed in which a thin walled container encloses the disk file. The container body is clamped between the baseplate of the file and an external mounting bracket which mounts the file to a frame so that the container "floats" relative to both the frame and the baseplate. A double-seamed visco-elastic seal is employed for attaching the cover of the container to the container body.

9 Claims, 5 Drawing Figures

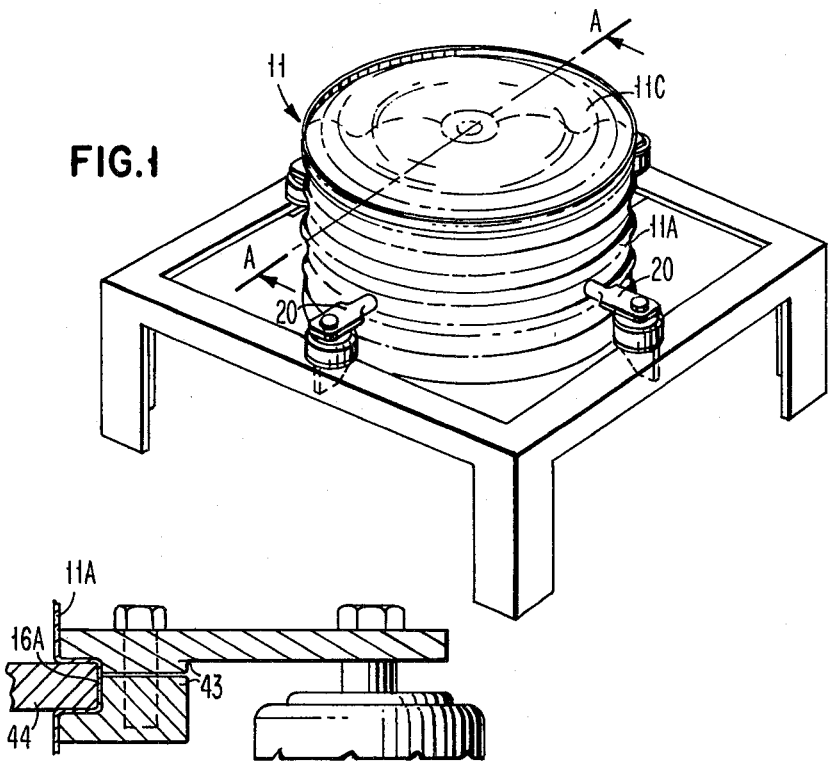
FIG.1
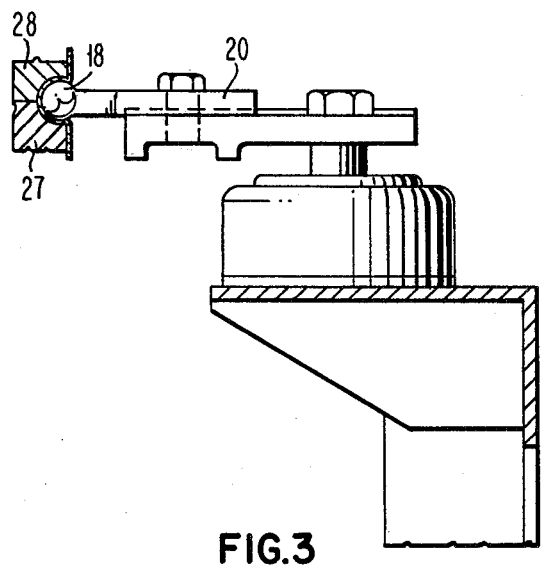
FIG.3A
FIG.3
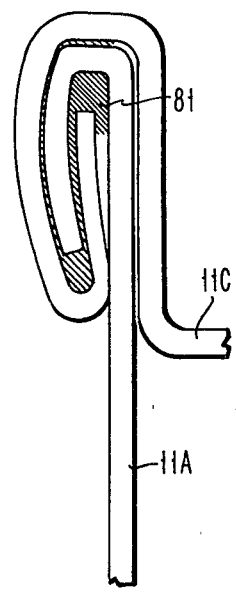
FIG.4

FERMETICALLY SEALED DISK FILE

DESCRIPTION

TECHNICAL FIELD

This invention relates in general to information storage devices and, in particular, to hermetically sealed disk files. The invention is directed to an improved arrangement for hermetically enclosing a disk file which permits mounting of the baseplate of the file to a substantially rigid frame while simultaneously attaching the enclosure to the baseplate so that the enclosure is free to "float" relative to the baseplate and the frame.

PRIOR ART

It is well known in disk file technology that as a stack of disks is rotated in an environment of air, the frictional drag of the air on the disk surface increases the temperature of the air to a point where it can adversely affect the operation of the disk file. Many commercial disk files are, therefore, supplied with external ambient air to keep the temperature of the file components below known dangerous limits. Since, in most commercial disk files currently being marketed, the spacing between the magnetic head and the disk is so small, the air supplied for cooling must be filtered to prevent foreign particles which are normally found in the air from becoming lodged between the magnetic head and the disk surface. This is an added cost and requires periodic servicing.

One of the problems which has prevented the use of hermetically sealed files to date has been the heat generated by the frictional drag on the surface of the disk. It is generally known that the amount of heat generated by the frictional drag of moving parts can be reduced by introduction of an inert gas which is less dense than air. For example, when helium is substituted for air in the disk enclosure, considerably less heat is generated. In addition, the head disk spacing may be reduced which results in an improvement in the linear recording densities obtainable with a given disk surface and magnetic head.

The use of helium filled disk enclosures has not met with considerable commercial success in the past because of the problems of designing disk enclosures which would contain the helium without loss for a considerable period of time. The few commercially available storage devices that do employ helium provide a means for automatically or periodically replenishing lost helium. In most applications of large data base disk files, the replenishing approach has proved unattractive for a number of reasons.

SUMMARY OF THE INVENTION

The present invention is directed to an arrangement in which a hermetically sealed helium filled disk file enclosure is provided which does not require that the helium be replenished during the normal life of the disk file and in which a thin walled enclosure is attached to the baseplate of the disk file in a manner which permits limited expansion and contraction of the enclosure.

It is, therefore, an object of the present invention to provide a hermetically sealed helium filled disk file enclosure which does not require the helium to be replenished during the life of the file.

A further object of the present invention is to provide an improved arrangement for enclosing a disk file.

Another object of the present invention is to provide an arrangement for mounting the baseplate of a disk file to a rigid frame which also simultaneously attaches a thin walled enclosure to the baseplate.

A still further object of the present invention is to package a conventional moving head disk file in a conventional "tin can" type of enclosure.

In accordance with one aspect of the present invention, a conventional disk file is placed inside a cylindrical "tin can" type of container which is provided with a circumferentially convex corregation spaced midway between the ends of the can. A plurality of mounting brackets are provided for attaching the enclosure and file to a rigid frame.

Each bracket is attached to the frame at one end and is provided with a rounded portion at the opposite end which corresponds in shape to the circumferential corregation in the cylindrical container. A suitable two-part clamp is associated with the baseplate disposed inside the container which functions to clamp the convex corregation between the inner baseplate and the rounded end of the mounting bracket disposed in the convex corregation externally of the container.

In accordance with an additional feature of the present invention, the container is a deep drawn container so that it is only necessary to "seal" the cover to the container to provide a hermetically sealed enclosure. Where the container is to be filled with a gas which is relatively permeable, such as helium, a double-seamed viscoelastic seal, as used in the food canning industry, is employed to limit the amount of gas escaping from the container under normal operating conditions for the life of the disk file.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a perspective view of a hermetically sealed disk file in accordance with the present invention;

FIGS. 3, also 3A, are enlarged views of the mounting brackets shown in FIG. 1;

FIG. 4 is an enlarged view of the double-seamed viscoelastic seal shown in FIG. 2.

DESCRIPTION OF THE INVENTION

Figure 2:
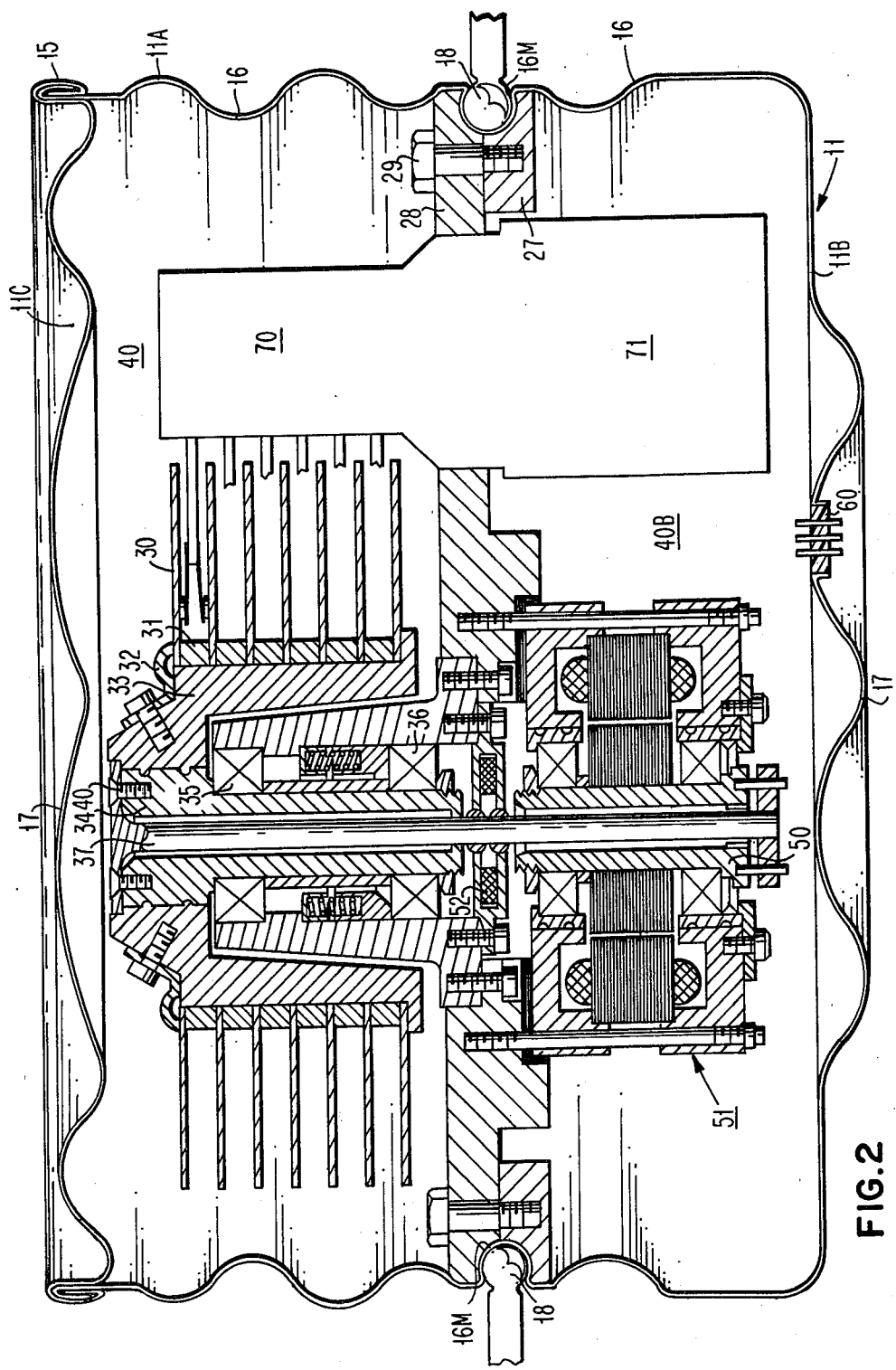
FIG. 2 is a sectional view of the disk file shown in FIG. 1 taken along the lines AA.

FIG. 1 is a perspective view of the improved hermetically sealed disk file. As shown in FIG. 1, the file comprises a frame 10, the file enclosure 11, and the mounting brackets 12A through 12D for mounting the file enclosure 11 to the frame 10. Enclosure 11, as shown, comprises a generally cylindrical container 11A which is deep drawn sheet metal and, therefore, is seamless and a cover portion 11C which is joined to the container 11A by a double-seamed viscoelastic seal 15 shown in detail in FIG. 4. Cylindrical container 11A is provided with a series of circumferentially disposed axially spaced corregations 16 which function to provide additional strength to the sides of the container. The integral bottom 11B of the enclosure 11 and the separate top cover 11C are also provided with radially displaced circumferentially disposed corregations 17 which also provide additional strength to these members.

As seen in FIG. 1, one circumferentially disposed corregation 16M, which has a semicircular cross-section, receives the distal end 18 of the mounting bracket 20. As shown in detail in FIG. 3, distal end 18 is shaped to conform to the cross-section of corregation 16M so that the baseplate clamping device 22, which has a complementary shape, may grip the distal end 18 of the bracket 20 with a portion of the corregation 16M therebetween.

FIG. 2, which is a sectional view along the lines AA of FIG. 1, shows how the container 11 is mounted relative to the disk file baseplate and the details of the clamping device 22 shown schematically in FIG. 1.

With reference to FIG. 2, the baseplate 28 is basically a circular disk 28 over which the container 11A can be slipped. A circumferential edge 28A of the baseplate 28 is shaped to conform to a portion of the circular cross-section of the end 18 of the bracket 20. Likewise, the locking ring 27 is provided with a circumferential edge 27A, a portion of which is also shaped to conform to the bottom half of the circular cross-section 18 of bracket 20. Circular edges 27A and 28A of the clamping device define a recess which extends circumferentially for more than 180° relative to the circular cross-sectional end 18 of bracket 20. As the clamping ring 27 is brought into contact with the baseplate 28 by action of the bolts 29, the respective edges 27A and 28A surround end 18 of bracket 20 and clamp the corregation 16M of the container 11A to the baseplate.

As shown in FIGS. 1 and 2, four bracket members 20 are provided and the clamping arrangement 22 involves a clamping ring 27 which extends completely around the inside of the container. The baseplate 28 is, therefore, clamped around its entire circumference, which permits the container 11A to be divided into upper and lower compartments 40A and 40B.

As shown in FIG. 2, the baseplate 28 supports the major components of the disk file in a conventional manner. The disk spindle assembly DS comprises the disks 30, the disk spacing rings 31, the disk clamp 32 which is attached to the spindle hub 33 by suitable bolts. Hub 33 is attached to the spindle shaft 34 which is mounted for rotation in bearings 35 and 36 which are disposed in the stationary cone-shaped bearing support member 38. Bearing support member 38 is attached to the baseplate 28 by suitable bolts 39. A quill-type shaft 37 extends through the baseplate and the center of spindle 34. The quill shaft 37 is attached to the top of the spindle 34 by suitable screws. The other end of the quill shaft 37 is similarly attached to the rotor 50 of the motor 51 in compartment 40B, but is allowed to move axially to accommodate thermal expansion.

A ferro-fluid seal 52 is provided on shaft 37 which functions to prevent the flow of helium between compartments 40A and 40B.

The motor 50 is attached to the underside of the baseplate 28 and is energized from conductors which extend through the container 11A at the electrical feedthrough unit 60, one of which is shown in FIG. 2. Unit 60 is well known in the art and is quite effective in maintaining the integrity of the hermetically sealed container 11A.

The last major component of the disk file, as shown in FIG. 2, is the access mechanism 70. The access mechanism shown in FIG. 2 may be of the swinging or rotary arm type actuator, such as shown in FIG. 1 of U.S. Pat. No. 3,849,800.

As is well known, the function of the access mechanism 70 is to position a magnetic transducer in data transfer relationship with a selected track on one of the magnetic disks 30. The motor 71 of the access mechanism 70 is also mounted to baseplate 28.

The packaging of the disk file in container 11A establishes two separate compartments 40A and 40B. While the compartments are not hermetically sealed relative to each other, the clamping arrangement of the baseplate to the sides of the container and the ferrofluidic seal 52 prevents any internally generated contaminants originating from either of the motors from entering section 40A where they might interfere with the head-disk relationship.

The manner in which the cover 11C seals container 11A is shown in FIG. 4. FIG. 4 is a cross-section of the double-seamed viscoelastic seal which functions to hermetically seal cover 11C to container 11A. As is well-recognized in the food canning industry, the sealing compound 81 and the mechanical interlock between the can body and cover work together to make the double seam a hermetic seal. Neither the sealing compound nor the mechanically interlocked cover and container alone are able to hermetically seal the container. They must complement each other. The correct sealing compound must be placed on the cover 11C at the correct density and volume to be effective. The sealing compound must have adequate adherence to both the cover and the container, be relatively impermeable to helium, be relatively free from tackiness, and have a viscosity, stability and consistency to give proper flow characteristics during the forming of the double seam.

The sealing material 81, disposed between the seams formed by the cover 11C in the side 11A, may be of the general type used in the food canning industry, which is generally one of two types of materials, i.e., polyisobutylene and butadiene-styrene.

The sealing material is basically a gap filling adhesive where the gap is not a fixed space but a constantly changing one. The sealant should adhere to the container and allow large strains without accumulating stress which would disrupt the seal.

The permeability of the sealing material to helium is also an important consideration. Polyisobutylene type sealants have a relatively low permeability to helium. It has been estimated that such a seal would permit less than 10% decrease in volume of helium over a 10 year estimated life of a helium filled disk file of the type shown in FIG. 2.

FIG. 3a illustrates a modification of the clamping device 22 shown in FIG. 3. As shown in FIG. 3a, the two-part member 43 is disposed externally of container 11A and a convex corregation 16A is provided in the side of container 11A. The one-piece member 44 is insertable into the convex corregation 16A internally of the container. The one-piece member 44 is a split ring which has a circumference corresponding to the dimension of the corregation 16A. The ring is split which permits it to be collapsed slightly for ease of placement into the corregation 16A. The ring is sufficiently wide to permit attaching it to the baseplate 28 at appropriate locations.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent, is:

1. A hermetically sealed disk file comprising:
   (a) a baseplate for mounting the major components of said disk file in fixed relationship to each other;
   (b) a two-part thin walled container for completely enclosing said baseplate and said components of said disk file, said parts being hermetically sealed by a double-seamed viscoelastic seal; and
   (b) means for mounting said baseplate to a frame while simultaneously mounting said thin walled container to said baseplate and in generally floating relationship to both said baseplate and said frame.

2. The combination recited in claim 1 further including a frame for supporting said baseplate.

3. The combination recited in claim 2 in which said disk file further includes helium gas disposed in said container at substantially atmospheric pressure.

4. The combination recited in claim 2 in which said mounting means includes a plurality of clamping devices, each of which includes a first and second member, one of which is selectably clampable to the other with a section of said container disposed therebetween, one of said members being attached to said baseplate and disposed internally of said container, said other member being disposed externally of said container and adapted to be connected to said frame.

5. The combination recited in claim 4 in which said second member has one end which is provided with a circular cross-section, said container includes a circumferential section provided with a corregation adapted to receive said one end of said member having said circular cross-section, said first member comprises two separate parts which together define an opening for receiving said convex corregation and said one end, and means for moving said two parts relative to each other to clamp said first member to said second member with said corregation disposed between said members.

6. The combination recited in claim 5 in which said container is mounted to said baseplate to provide two separate substantially independent compartments within said container.

7. The combination recited in claim 6 in which said file includes a plurality of magnetic disks which are supported for rotation by a disk spindle whose axis is normal to the plane of said baseplate and which is mounted in said baseplate.

8. The combination recited in claim 7 further including a transducer positioning mechanism mounted on said baseplate for positioning magnetic transducers in transducing relationship with said disks.

9. The combination recited in claim 8 further including means for feeding electrical connections to and from said major components through the wall of said container without affecting the hermetically sealed characteristics of said container.

* * * * *